Sept. 4, 1951 F. G. FIRTH 2,566,984
MAGNETOSTRICTIVE DEVICE
Filed May 14, 1948
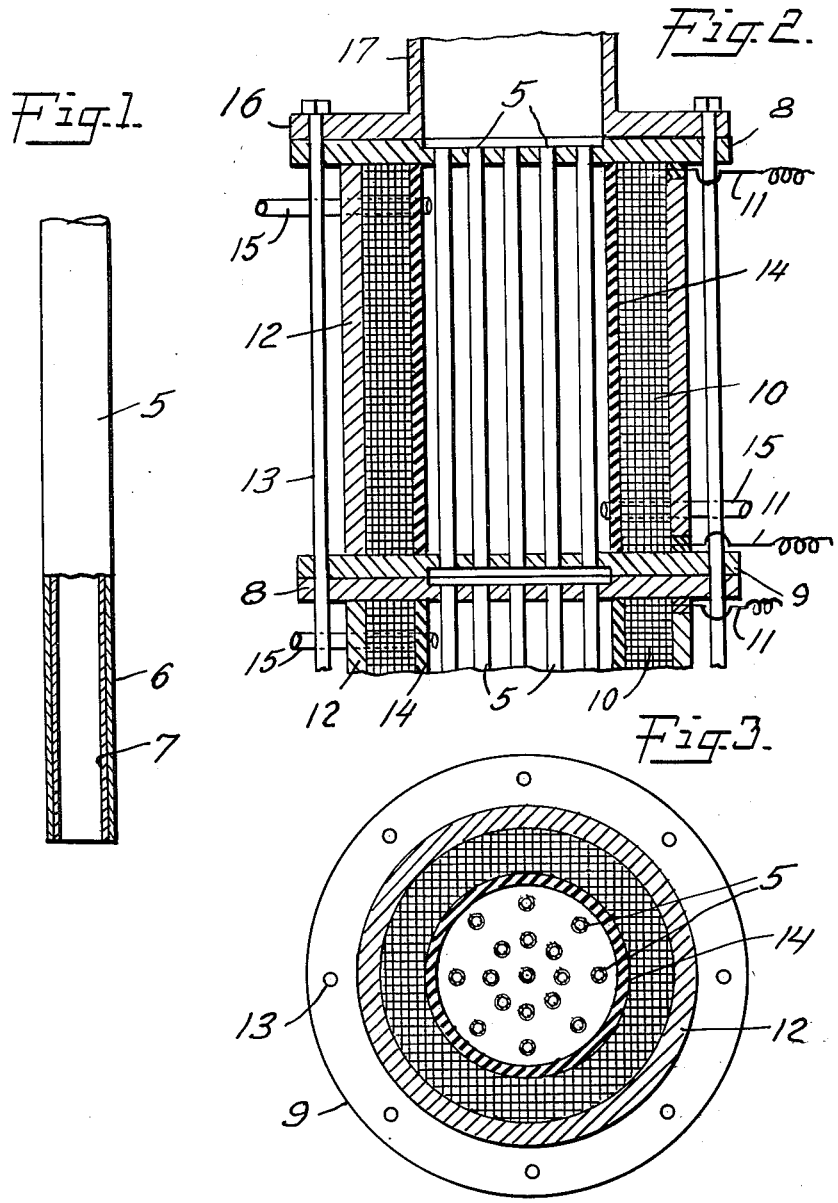
INVENTOR
Francis George Firth
BY
Pennie, Edmonds, Morton & Barrows
ATTORNEYS Patented Sept. 4, 1951

2,566,984

UNITED STATES PATENT OFFICE 2,566,984

MAGNETOSTRICTIVE DEVICE

Francis George Firth, New York, N. Y.

Application May 14, 1948, Serial No. 27,096

4 Claims. (Cl. 171—209)

This invention relates to magneto-strictive devices, and has for its object the provision of an improved magneto-strictive device. More particularly, the invention contemplates, as a new article of manufacture, a composite tubular unit having magneto-striction properties made of concentric magneto-strictive elements of opposite coefficients of magneto-striction. A further object of the invention is the provision of a novel magneto-strictive device embodying the composite tubular unit of the invention in association with means for applying thereto an alternating magnetic field. The magneto-strictive devices of the invention are especially useful for producing high energy concentrations in liquid, gaseous and solid media.

Certain phenomena in connection with the induction of energy of sound and ultrasonic frequencies within fluids have proven of considerable industrial interest in several technological fields. Some of these applications have been described in the technical literature, but have not been commercially applied, at least to any great extent, because of the lack of suitable and practical instrumentation. Some of the more specialized applications of sound and ultrasonic energy to fluid substances include orientation, coagulation, fractionation, and dispersion in various media.

Orientation may be advantageously applied to paper making and allied fibre industries, to high polymer extrusion, and to thread, cord or rope manufacture. In the coagulation field, it is possible to coagulate dusts, smokes, and other aerosols in gaseous suspension. In liquids, emulsions can be made or broken, colloidal suspensions coagulated, sterilizations achieved, and crystallizations facilitated with suitable apparatus and energy input. Under other precise conditions, fractionations of gases, liquids and solids can be assisted by the same type of energy converter.

The desirability of high energy mixing in a concentrated mixing zone is appreciated by those familiar with chemical and other allied technological processes and arts. The rate of reaction of a large number of chemical and other reactions are dependent to a great extent on the intensity of mixing, such for example as the degree of agitation applied. Some of these reactions include, among others, those of oxidation, hydrogenation, esterification, polymerization, hydrolysis, reduction, precipitation, saponification, emulsification, homogenization, dispersions, coagulation, vaporization, mechanical mixing etc.

It has been recognized in the art that intensive mixing at a high energy input level would accelerate considerably the reaction rates involved in some of the aforementioned operations, thus enabling the reactions to be made continuous in operation, rather than batch. Greater uniformity of product would also ensue, due to better control in the reaction zone, by varying the intensity of the agitation, the temperature, rate of flow, concentration, and time in the reactor zone of the reacting materials.

The form of agitation usually employed in such cases is of a simple nature, such as a mechanically driven propeller, a shaker agitation device, or the like. Supersonic or ultrasound devices have been described in the literature for producing high energy concentrations in reaction zones, but the practical application of sound and ultrasound frequencies to industrial large scale, high power applications have been limited by several serious practical difficulties that have been encountered.

A piezo-electric transducer, such as a quartz crystal suitably cut and excited, can be made to produce high energy concentrations in the vicinity of the crystal. The limitations of such a device are due, amongst others, to their fragile nature, high cost, low power limitations (10 watts/sq. cm.), and electrical insulation problems.

Magneto-strictive devices for the same type of applications have also been described in the literature, and usually consist basically of a nickel or other rod or tube suitably cooled and placed in an alternating electromagnetic field. The energy developed, due to the magneto-strictive effect, can be transferred either directly, or through a suitable liquid, gaseous, or solid transfer medium, to the desired zone of application. Such devices however are somewhat impracticable for large power transfer requirements, and inefficient, due to the relatively small areas available for the production of useful work.

It has been recognized as highly desirable that these drawbacks of the piezo-electrical crystal, and/or magneto-striction device be overcome, so that the practical application of suitable electro-mechanical energy to commercial conditions be available. The device of the invention overcomes these drawbacks and meets the requirements of large scale commercial applications.

Certain materials have pronounced magneto-strictive properties, that is, the property of undergoing a change in dimension under the influence of a magnetic field. Some materials change dimension in a negative direction, that is, they shrink and are said to have a negative magneto-strictive coefficient. Such materials include nickel and certain alloys of high nickel content, iron, and annealed cobalt. Materials that can increase in length under the influence of a magnetic field are said to have a positive coefficient of magnetostriction. Included in this group are certain iron-aluminum alloys containing between about 5 and 17% aluminum, and cast cobalt.

For purposes of illustration only, two magnetostrictive elements are herein employed to describe the principle of the invention and a preferred embodiment thereof, namely nickel and an iron-aluminum alloy having an aluminum content of about 13.4%. Nickel (including copper and other alloys of high nickel content such as Monel metal) is to be understood as representative of elements having a negative magneto-strictive coefficient, and the iron-aluminum alloy as representative of elements having a positive magnetostrictive coefficient. Cast cobalt and iron-aluminum alloys containing from about 5 to 17% aluminum are other known positive magneto-strictive metals, and iron and annealed cobalt are other known negative magneto-strictive metals.

The device of the invention is a transducer or energy transformer comprising a composite tube, or a plurality of such tubes, made of two elements having opposite coefficients of magnetostriction operatively associated with means for producing a changing magnetic field. If a strip of iron-aluminum alloy and a strip of nickel are securely fastened together and placed in a longitudinal magnetic field, the composite strip will bend, due to the expansion of the positive coefficient alloy, and to the contraction of the negative coefficient nickel. The same principle applied to the construction of a composite tube produces a magneto-strictive device of unique properties. Such a composite tube may be made by rigidly securing together two concentric tubular elements of positive and negative coefficients of magneto-striction respectively. When such a magneto-strictive composite tube is subjected to the influence of a magnetic field of alternating frequency, so that the direction of the magnetic polarity lies along the tube length, longitudinal vibrations will be produced within the body of the tube, the frequency of vibration being a function of the frequency of alternation of the magnetic field and the intensity of vibration being a function of the strength of the magnetic field. The vibrations of the composite tube will be transmitted to any reacting materials, gaseous, liquid or solid, within the body of the tube.

The invention will be better understood from the following description taken in conjunction with the accompanying drawings, in which Fig. 1 is an enlarged view, partly in section, of a composite tube of the invention, Fig. 2 is a sectional elevation through an energy transformer embodying a plurality of the composite tubes, and Fig. 3 is a horizontal sectional view of the energy transformer of Fig. 2.

The composite tube 5 comprises two concentric tubular elements 6 and 7 in intimate contact and rigidly secured together. The outer tubular element 6 is nickel, having a negative coefficient of magneto-striction, and the inner tubular element 7 is an iron-aluminum alloy with an aluminum content of about 13.4% having a positive coefficient of magneto-striction. The inner tubular element of the composite tube may be of the negative magneto-strictive material and the outer tubular element may be of the positive magnetostrictive material. The article may be conveniently made by electro-plating a thick deposit of nickel metal of suitable thickness around a tube of the iron-aluminum alloy. Alternately, the two tubular elements may be welded together, or they may be brazed together in a suitable furnace with a hard solder, copper, or other bond. However manufactured, the two concentric tubular elements of opposite coefficients of magnetostriction are rigidly secured together.

In the device shown in Figs. 2 and 3 of the drawing, a plurality of the composite tubes 5 are held parallel to each other between two suitably spaced end plates 8 and 9. The tubes are securely held in each end-plate by a brazing, welding or expansion technique. The cluster of composite tubes 5 is surrounded by an electro-magnetic coil 10 having electric conductor terminals 11 adapted to be connected to a suitable source of electric energy. The coil is surrounded by an outer magnetic shield 12. The assembly is held together by bolts 13 passing through registering holes in the end plates 8 and 9. The end-plates 8 and 9 and the shield 12 are made of a material having high magnetic permeability. The coil 10 preferably has a cylindrical liquid-tight lining 14 of low magnetic permeability, so that when desired a cooling, or heating medium, can be passed around the cluster of tubes 5 by means of the inlet and outlet pipes 15.

The complete device just described is shown in Fig. 2 with its bottom end plate 9 bolted to the top end plate 8 of a similar device, thus connecting the two devices in series and doubling the active length of treatment. As many devices as desired may thus be connected in series. The end plate 8 of the upper device in Fig. 2 is bolted to an end plate 16 of a terminal pipe or manifold 17 in communication with all of the tubes 5 of the upper device. An end plate and pipe, similar to 16 and 17, respectively, will be similarly connected to the bottom end plate 9 of the lowermost device. The terminal pipes 17 serve for the introduction to and discharge from the series of devices of the reacting materials and reaction product, respectively.

In operating the device shown in Figs. 2 and 3 (as well as in operating a single composite tube such as shown in Fig. 1), the reacting materials may be continuously passed through the tubes or may be treated in the tubes as a batch operation. When the electro-magnetic coil 10 is excited by an alternating current of suitable frequency, a magnetic field will be produced along the length of the tubes, and the direction of polarity of the magnetic field will change at a rate which is a function of the applied frequency. Thus each tube in the cluster will vibrate independently along its length, and the vibration of the tubes will be transmitted to the reacting materials therein. As previously stated, the reacting materials may be flowing continuously through the tubes or may be confined therein during treatment.

The magneto-strictive device of the invention may be advantageously applied to any of the operations hereinbefore mentioned for producing high energy concentrations in liquid, gaseous and solid media. While the device is especially suited for producing vibrations in the supersonic range of from 15,000 cycles per second up to 1 megacycle per second, it is equally well adapted for producing vibrations of lower frequency even down to 10 cycles per second. The composite tubes may be of any desired shape, size and length and may be mounted and held in posi-

I claim:

1. A device of the character described comprising a tube made of two concentric tubular elements rigidly secured together, one of said elements having a positive magneto-strictive coefficient and the other element having a negative magneto-strictive coefficient, means for applying an alternating magnetic field to said tube, and terminal means communicating with the opposite ends of said tube for the introduction to and discharge from the tube of a reacting material.

2. A device of the character described comprising a bi-metallic tube made of a tubular element of nickel or nickel alloy rigidly secured to a concentric tubular element of an iron-aluminum alloy having an aluminum content of from 5.8 to 17%, means for applying an alternating magnetic field to the bi-metallic tube, and terminal means communicating with the opposite ends of said tube for the introduction to and discharge from the tube of a reacting material.

3. A device of the character described comprising a plurality of spaced parallel tubes each of which is made of two concentric tubular elements rigidly secured together, one element of each tube having a positive magneto-strictive coefficient and the other element of each tube having a negative magneto-strictive coefficient, means for applying an alternating magnetic field to said tubes, and terminal manifolds communicating with the opposite ends of said tubes for the introduction to and discharge from the tubes of a reacting material.

4. A device of the character described comprising a cluster of tubes held in spaced and parallel relation with one another by plates in which the opposite ends of the tubes are rigidly secured, each of said tubes being made of two concentric tubular elements rigidly secured together, one element of each tube having a positive magneto-strictive coefficient and the other element of each tube having a negative magneto-strictive coefficient, means for applying an alternating magnetic field to said cluster of tubes, and terminal manifolds communicating with the opposite ends of said cluster of tubes for the introduction to and discharge from the tubes of a reacting material.

FRANCIS GEORGE FIRTH.

REFERENCES CITED

The following references are of record in the file of this patent:

UNITED STATES PATENTS

| Number | Name | Date |
|---|---|---|
| 1,882,397 | Pierce | Oct. 11, 1932 |
| 2,453,595 | Rosenthal | Nov. 9, 1948 |